Nov. 13, 1962  K. D. SCHREYER  3,063,545
FEEDING CONVEYOR
Filed June 23, 1958  2 Sheets-Sheet 1
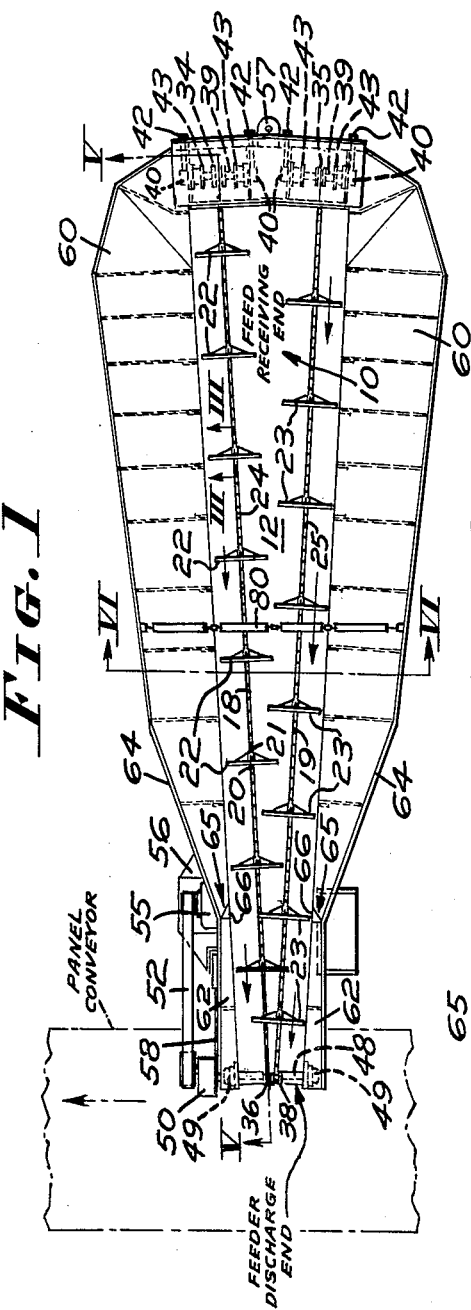

Nov. 13, 1962 K. D. SCHREYER 3,063,545
FEEDING CONVEYOR
Filed June 23, 1958 2 Sheets-Sheet 2
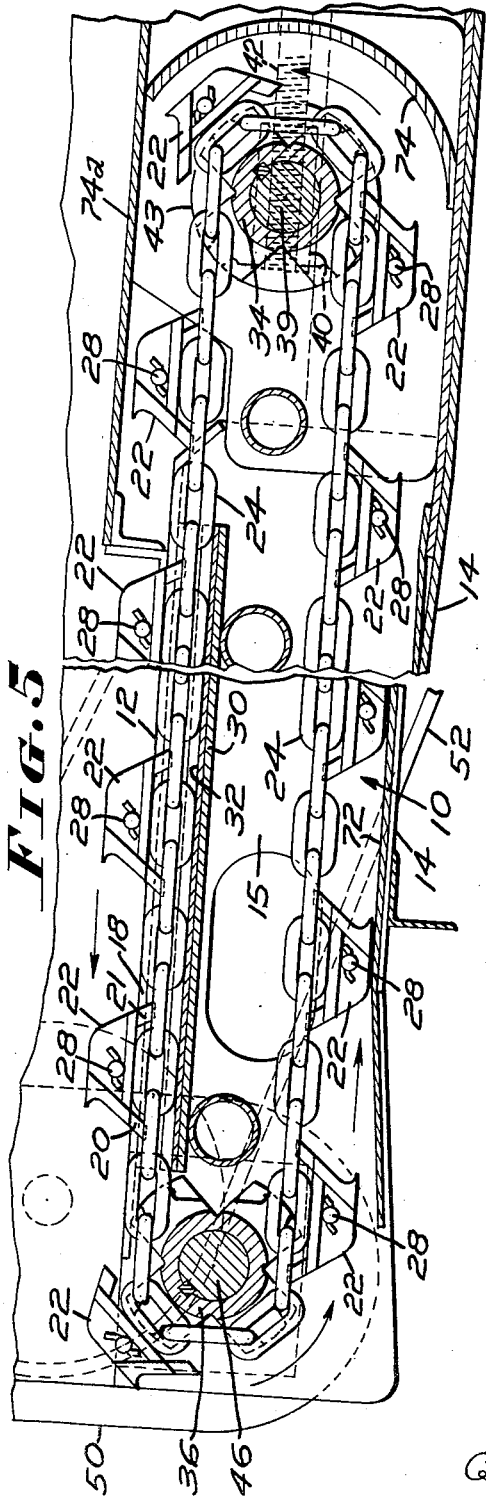
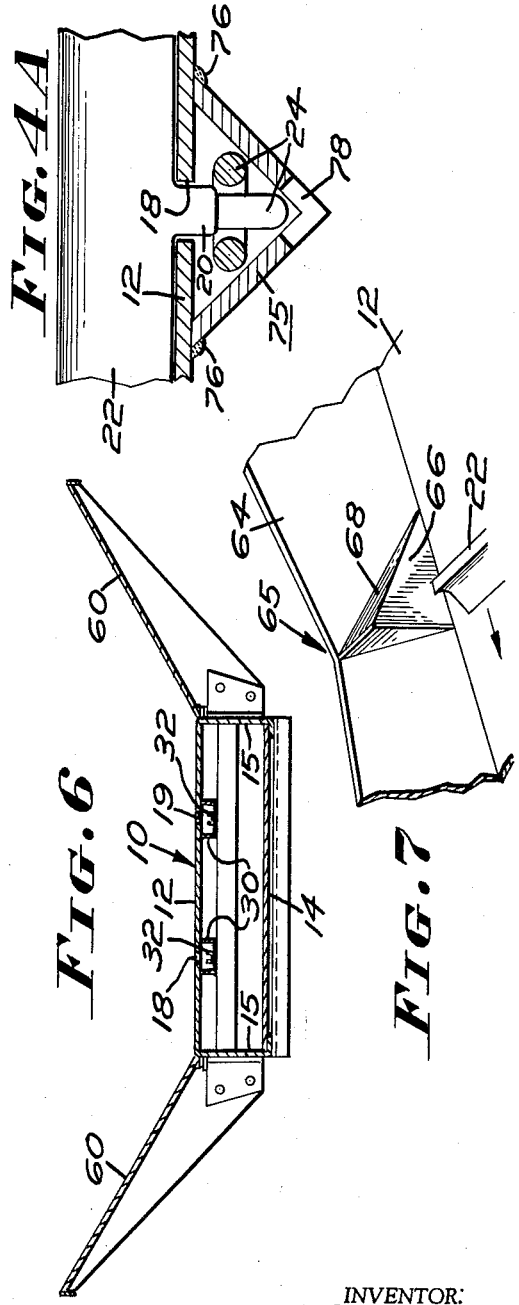
INVENTOR:
KENNETH D. SCHREYER
BY:
Beau, Brooks, Buckley & Beau,
ATTORNEYS.

United States Patent Office 3,063,545
Patented Nov. 13, 1962

3,063,545
FEEDING CONVEYOR
Kenneth D. Schreyer, Snyder, N.Y., assignor to Columbus McKinnon Corporation, a corporation of New York
Filed June 23, 1958, Ser. No. 743,863
14 Claims. (Cl. 198—76)

This invention relates to coal mining machinery or the like, and more particularly to a novel feeder adapted to receive batch loads, such as of mined coal, ore, rock, or other lump or granular materials, from shuttle cars or the like to deliver the material at a reduced uniform rate such as to the mine panel conveyor, elevator, or other handling equipment.

It is a primary object of the invention to provide a machine as aforesaid which embodies a novel combination arrangement of a plurality of conveying components and which is adapted to receive successive loadings from batch conveyances or the like at the maximum rates of discharge thereof so as to promptly release such conveyances for return trips, while automatically integrating the feed material into a uniform rate delivery flow to the receiving equipment, such as a conventionally employed conveyor for carrying the material to a processing plant.

Another object of the invention is to provide a novel feeder as aforesaid which is particularly suited for example to low coal seam mining conditions, and which operates automatically to provide a uniform delivery rate irrespective of variable loadings thereof.

Still another object is to provide a novel feeder as aforesaid which may be constructed of low head room dimension and compact and rugged and simple in construction and readily portable, and relatively inexpensive to manufacture.

Other objects and advantages of the invention will appear from the specifications hereinafter.

In the accompanying drawings:

FIG. 1 is a top plan view of a machine of the invention;

FIG. 2 is an enlarged scale side elevational view thereof;

FIG. 3 is a fragmentary enlarged scale longitudinal sectional view through a detail of the conveying mechanism, taken along line III—III of FIG. 1;

FIG. 4 is a fragmentary transverse sectional view taken along line IV—IV of FIG. 3;

FIG. 4–A is a view corresponding to FIG. 4 but of a modified form of construction of that detail of the machine;

FIG. 5 is a fragmentary enlarged scale sectional view taken along line V—V of FIG. 1;

FIG. 6 is an enlarged scale scetional view taken along line VI—VI of FIG. 1; and FIG. 7 is a fragmentary enlarged scale perspective view of the detail of construction circled at VII in FIG. 2.

The invention generally contemplates provision of a feeder for coal or the like which comprises a readily portable unitized machine having apparatus for discharging, at a more uniform rate, material which may be received by the machine in intermittent, irregular, variable or batch loadings with the apparatus comprising a plurality of material conveying components each of which pass through a conveyor path with the conveying components traversing a given course which extends from a material receiving portion to a material discharge portion of the apparatus. The conveying components are disposed in converging relationship relative to each other in a downstream direction from the material receiving portion of the apparatus along the given course toward the material discharge portion of the apparatus with the conveying components being in close proximity and having parts thereof disposed in laterally overlapping relationship relative to the given course for a substantial distance therealong.

The apparatus is operatably supported by means or structure which defines, intermediate the material intake and material discharge portions of the apparatus, a zone whereat material may be received and stored with the support means or structure being disposed along the conveyor course in spaced relationship to the paths of the respective conveying components.

In this way, the apparatus will integrate variable material loadings by deflecting some of the integrated material generally laterally to opposed directions relative to the conveyor course of the conveying components and beyond the respective paths to the storing zone with the remaining integrated material passing to the material discharge portion of the apparatus. Thus, the machine is adapted to receive either constant or intermittent feed supplies while constantly delivering a uniform flow of material to the mine panel conveyor belt, or the like.

As shown in the drawing herewith the machine may be constructed to comprise support means or structure which may take, if desired, the form of a box-sectioned bottom or keel portion designated 10 which may be constructed as shown in FIG. 6 to comprise upper and lower plates 12, 14 respectively, which are interconnected by side wall plates 15—15. As shown in FIG. 1 this base structure is of truncated triangle form in plan view; being substantially wider at the intake end portion of the machine compared to the discharge end portion thereof. As illustrated in FIGS. 3–6, the bottom plate 12 is generally longitudinally slotted to accommodate apparatus having the desired number of convergent conveyor components, consisting in the example illustrated of two scraper conveyors as indicated at 18, 19. Thus, the slots accommodate in free-sliding relation therein fore and aft leg portions 20, 21 of a series of scraper conveyor flights 22, 23 carried in spaced relation on corresponding separate endless link chains 24, 25. Thus, the legs portions 20, 21 stabilize the flights against forces tending to cause them to twist such as responsive to unequal loadings on the flights at opposite sides of the power chain, and such as would otherwise cause twisting and tightening of the chain resulting in excessive loads and wear upon the chain and sprocket system. Also, this arrangement minimizes the frictional resistance to the conveyor operation. As shown in the drawing, the chains 24, 25 are of the welded link type being thereby freely flexible in two directions; occasional of the links in the region of each flight being formed with an integrally extending eye portion 26 (FIG. 3) receiving a mounting pin 28 carried by clevis portions 29—29 of the flight members.

Just below the slots 18, 19 the top plate 12 carries corresponding housings 30 supporting grooved slide rails 32 which receive and vertically support the lower edges of the vertically disposed links of the upper strands of the power chains while their upper edges are slidably stabilized in the slots 18, 19. The horizontally disposed links of the chains 24, 25 ride under the plate 12 and thus "hold down" the chains and flights against any tendency to ride up over the material being handled. The chains 24, 25 train at the feed receiving end of the machine around idling pocket wheels 34, 35 respectively; and at the discharge end of the machine they train around pocket wheels 36, 38. The flights 22, 23, are positioned on the chains 18, 19 so as to mesh without relative interference as the devices train around the wheels 36, 38. The wheels 34, 35 are carried by shafts 39—39 which are suitably journalled on the machine by bearing blocks 40—40 which are positionally adjustable on the machine frame by means of screws 42 for chain slack take-up purposes. The shafts 39 also mount idler wheels 43 for engaging the flights as the chains ride around their pocket wheels, to stabilize the conveyor flight movements.

The pocket wheels 36, 38 at the discharge end of the machine are carried by a shaft 48 which is journalled in bearings 49—49 mounted on the machine frame. This shaft is driven through a speed reducer 50 by means of a belt and pulley system 52 and an electric motor 55 which is conveniently mounted in a skid frame 56 disposed to extend as a sub-assembly beneath the discharge end portion of the main frame component 10. Thus, a hook eye as indicated at 57 (FIGS. 1, 2) is conveniently provided at the opposite end of the machine for coupling to a tractor or the like which may thereupon pull upon the feed end of the machine to cause it to skid and swivel upon the frame 56 thereby facilitating dragging of the machine from work place to work place. An overload protection device as indicated at 58 is preferably arranged in conjunction with the power transmission mechanism to operate automatically upon overloading or jamming of the conveyor components to "slip" the driving connection between the motor and the driving pocket wheels, and/or to deenergize the motor.

As illustrated herein, sheet metal hopper sides 60—60 are provided at opposite sides of the feed receiving end of the machine, to retain the coal or other feed material in gravity-feeding relation to the scraper conveyor components. At the discharge end of the machine a pair of substantially vertically standing side boards 62—62 are provided to meter the discharge flow of material from the feeder at the desired rate. Intermediately of the main hopper and meter board portions of the conveyor are provided opposed convergent "throttling" side boards 64—64 joining the meter boards 62—62 at a choke station 65 (FIGS. 1, 2, 7). Cam blocks as indicated at 66 are provided at each side wall portion of the choke station 65, and are formed with upwardly sloping faces 68 adapted to cam upwardly any lumps of material otherwise tending to jam the movements of the conveyor flights through the choke station. A feed reducer or control in the form of a cross drag chain as indicated at 80 (FIG. 1) may be employed as shown to retard passage of excess piles of feed material to the delivery end of the machine.

As shown in FIG. 4, the bottom walls of the chain carrying housings 30 are suitably apertured as indicated at 70 so as to permit escape of coal dust or fragments falling through the slots 18, 19. Thus, leakages through the slots will fall to the bottom plate 14 whereupon they will be picked up by the flights 22 of the return strand of the conveyor and thereby scraped rearwardly along scraper plates 72 (FIG. 5) and then upwardly and over against a reverse bent guide plate 74 at rear end of the machine; being thereby mingled with the material being fed to the machine. A cover plate 74a is provided to avoid dumping of feed material into the conveyor wheel mechanisms at the feed end of the machine. FIG. 4A shows a modified form of power chain housing arrangement wherein a standard angle-sectioned stock piece 75 is employed in lieu of the channel-sectioned stock piece 30 of FIG. 4. In both cases the housings are readily fabricated to the top plate 12 as by means of welding at 76; and in the case of the construction of FIG. 4A dust escape apertures are readily provided by means of intermittently located cutouts 78.

It will of course be appreciated that whereas only one form of the invention has been illustrated and described in detail, various changes may be made therein without departing from the spirit of the invention or the scope of the following claims.

I claim:

1. A material feeder for intermittently receiving batch loadings of material and delivering the same at a uniform reduced rate of discharge, said feeder comprising a generally taper-shaped bed having convergently directed slots therein, a plurality of scraper conveyor components traversing said bed and moving convergently towards the narrow end thereof, said conveyor components each comprising an endless power strand disposed within one of said slots and carrying above said bed a plurality of spaced apart transversely projecting scraper flights, said slots being arranged in closely convergent relation at the discharge end of the feeder while being spaced substantially apart at the load receiving end of the feeder, said flights being arranged in staggered relation longitudinally of said feeder on said strands so as to extend tranversely thereof and being dimensioned so as to cooperatively span substantially the width of the load receiving end of said bed so as to gather the material loadings at the broad end of said feeder and to deliver the material at a uniform reduced rate at a common discharge point at the discharge end of the feeder while the flights of adjacent conveyor components intermesh without relative interference as they successively approach the discharge end of the feeder, and said bed including hopper-like side walls extending along said conveyor components for storing material and delivering the same to said conveyor components.

2. A discrete material feeder for receiving batch loadings of material and delivering the same at a uniform reduced rate of discharge, said feeder comprising a material supporting base plate having convergently directed slots therein, a plurality of conveyor components each comprising a power stand disposed in a slide channel beneath one of said slots and extending through said slot and carrying above said base plate relatively spaced tranversely disposed flights, said slots being arranged in closely convergent relation at the discharge end of the feeder while being relatively widely spaced apart at the load receiving end of the feeder, said flights being arranged in staggered relation longitudinally of said feeder on said strands so as to extend transversely thereof and being dimensioned so as to cooperatively span substantially the width of the load receiving end of said base plate so as to gather the material loadings and to deliver the material at a common position at the discharge end of the feeder while the flights of adjacent conveyor components intermesh without relative interference as they successively approach the discharge end of the feeder, said base plate including sloped side walls extending along said conveyor components for storing material and delivering the same to said conveyor components.

3. A material feeder for receiving loadings of material and delivering the same at a uniform rate of discharge, said feeder comprising a portable unit including a base plate slotted in converging relation, a plurality of conveyor components each comprising a power strand sliding within one of said slots and mounting transversely disposed conveyor flights having means extending slidably into said slots and connecting said flights to said strands and guiding the latter, said slots being arranged in relatively close relation at the discharge end of the feeder while being relatively widely spaced apart at the load receiving end of the feeder, said flights being arranged in staggered relation longitudinally of said feeder on said strands so as to extend transversely thereof and being dimensioned so as to cooperatively span substantially the width of the load receiving end of said base plate so as to gather the material loadings and to deliver the material at the discharge end of the feeder, said base plate including sloped side walls extending along said conveyor components for storing material and delivering the same to said conveyor components.

4. A discrete material feeder for receiving batch loadings of material and delivering the same at a more uniform rate of discharge, said feeder comprising a base plate convergently slotted, a plurality of conveyor components each comprising a power strand guided by one of said slots and mounting transversely disposed relatively spaced conveyor flights, said slots being arranged in relatively close relation at the discharge end of the feeder while being relatively widely spaced apart at the load receiving end of the feeder, said flights being arranged in staggered relation longitudinally of said feeder on said strands so as to extend transversely thereof and being dimensioned so as to cooperatively span substantially the width of the load receiving end of said base plate so as to gather the material loadings and to deliver the material at a common point at the discharge end of the feeder while the flights of adjacent conveyor components intermesh without relative interference as they successively approach the discharge end of the feeder, said base plate including sloped side walls extending along said conveyor components for storing material and delivering the same to said conveyor components.

5. A discrete material feeder for receiving batch loadings of material and delivering the same at a uniform reduced rate of discharge, said feeder comprising a unit machine including a material supporting bed having therein a plurality of conveyor receiving slots directed convergently towards the discharge end thereof, said conveyor components each comprising an endless chain mounting transversely disposed flights, said slots being arranged in relatively close relation at the discharge end of the feeder while being relatively widely spaced apart at the load receiving end of the feeder, common power supply means connected to each of said chains for continuous simultaneous operations thereof, said flights being arranged in staggered relation longitudinally of said feeder on said chains so as to extend transversely thereof and being dimensioned so as to cooperatively span substantially the width of the load receiving end of said bed so as to gather the material loadings and to deliver the material at a common point of discharge at the discharge end of the feeder while the flights of adjacent conveyor components intermesh without relative interference as they successively approach the discharge end of the feeder, said chains being of linked type and disposed so that the upstanding links of said chains slidably extend upwardly through said slots while the horizontally disposed links thereof ride below said bed and thereby preclude jumping of said chains upwardly out of said slots, said bed including hopper-like side walls extending generally parallel to said slots and disposed outwardly thereof for storing material and delivering the same to said conveyor components.

6. A material feeder for intermittently receiving batch loadings of material and delivering the same at a uniform reduced rate of discharge, said feeder comprising a generally taper-shaped bed plate having a plurality of convergently directed scraper conveyor components traversing said bed plate and moving convergently towards the narrow end thereof and having hopper-like side walls extending therealong, said conveyor components each comprising an endless power strand carrying above said bed plate a plurality of spaced apart transversely disposed scraper flights, said flights being arranged on said strands in staggered relation longitudinally of said feeder so as to gather the material loadings at the broad end of said feeder and to extend transversely thereof and being dimensioned so as to cooperatively span substantially the width of the load receiving end of said bed plate so as to deliver the material at a uniform reduced rate at a common point of discharge at the discharge end of the feeder while the flights of adjacent conveyor components intermesh without relative interference as they successively approach the discharge end of the feeder, said bed plate having hold down means integral therewith to bear against said strands to prevent the latter from rising from said bed plate as the conveyor flights approach said discharge end.

7. A material feeder for receiving loadings of material and delivering the same at a uniform rate of discharge, said feeder comprising a portable unit including a base plate slotted in converging relation having hopper-like side walls extending therealong, a plurality of conveyor components each comprising an endless power chain having a top strand portion sliding within one of said slots and mounting transversely disposed conveyor flights having means extending slidably into said slots and connecting said flights to said chain and guiding the flights, said slots being arranged in relatively close relation at the discharge end of the feeder while being relatively widely spaced apart at the load receiving end of the feeder, said flights being arranged on said strands in staggered relation longitudinally of said feeder so as to gather the material loadings and to extend transversely thereof and being dimensioned so as to cooperatively span substantially the width of the load receiving end of said base plate so as to deliver the material at a common point of discharge at the discharge end of the feeder, the bottom strand portion of each of said power chain having its returning flights in scraper bearing relation against a bottom plate whereby material sifting through said slots is returned to the material receiving end of said feeder.

8. A discrete material feeder for receiving batch loadings of material and delivering the same at a more uniform rate of discharge, said feeder comprising a base plate convergently slotted having hopper-like side walls extending therealong, a plurality of conveyor components each comprising an endless power strand formed of universally articulated chain links, each of said strands having its top flight portion guided by one of said slots and mounting transversely disposed relatively spaced conveyor flights, said slots being arranged in relatively close relation at the discharge end of the feeder while being relatively widely spaced apart at the load receiving end of the feeder, said chains training around a single drive shaft sprocket unit at the discharge end of said feeder and around separate angularly related sprockets at the feed end of said machine, said flights being arranged on said strands in staggered relation longitudinally of said feeder so as to gather the material loadings to extend transversely thereof and being dimensioned so as to cooperatively span substantially the width of the load receiving end of said base plate so as to deliver the material at a common point of discharge at the discharge end of the feeder while the flights of adjacent conveyor components intermesh without relative interferences as they successively approach the discharge end of the feeder.

9. A discrete material feeder for receiving batch loadings of material and delivering the same at a more uniform rate of discharge, said feeder comprising a base plate convergently slotted and having hopper-like side walls extending therealong, a plurality of conveyor components each comprising an endless power strand formed of universally articulated chain links, each of said strands having its top flight portion guided by one of said slots and mounting transversely disposed relatively spaced conveyor flights, said slots being arranged in relatively close relation at the discharge end of the feeder while being relatively widely spaced apart at the load receiving end of the feeder, said chains being driven by axially aligned sprockets at the discharge end of said feeder and training around separate angularly related guide means at the feed end of said machine, said flights being arranged on said strands in staggered relation longitudinally of said feeder so as to gather the material loadings to extend transversely thereof and being dimensioned so as to cooperatively span substantially the width of the load receiving end of said base plate so as to deliver the material at the discharge end of the feeder while the flights of adjacent conveyor components intermesh without relative interference as they successively approach the discharge end of the feeder.

10. A material feeder for receiving loadings of material and delivering the same at a uniform rate of discharge, said feeder comprising a portable unit including a bed plate slotted in converging relation and having hopper-like side walls extending therealong, a plurality of conveyor components each comprising an endless power strand disposed below the top level of the bed plate and sliding within one of said slots, means extending from said strands through said slots and mounting above said bed plate transversely disposed conveyor flights, said slots being arranged in relatively close relation at the discharge end of the feeder while being relatively widely spaced apart at the load receiving end of the feeder, said flights being staggered on said strands longitudinally of said feeder and cooperating to span the loading end of said bed plate so as to gather the material loadings and to deliver the material at the discharge end of the feeder while meshing together in interlapping relation without interferences as they approach the discharge end of said feeder.

11. Apparatus for discharging material at a rate which is more uniform than the rate which the apparatus may receive such material,
said apparatus comprising, in combination,
a material supporting bed having material receiving and material discharge portions, and
a plurality of material conveying components traversing a given course along said material supporting bed from the material receiving portion to the material discharge portion thereof,
said material conveying components being disposed in converging relationship relative to each other in a downstream direction from the material receiving portion of the material supporting bed along the given course toward the material discharge portion of the material supporting bed with the material conveying components being in close proximity and having parts thereof disposed in laterally overlapping relationship relative to the given course,
said material supporting bed having an intermediate portion extending between the material receiving and material discharge portions thereof and along the given course for storing material to enable variable material loadings to be received at the material receiving portion, integrated along the intermediate portion and delivered at a uniform rate to the material discharge portion of the material supporting bed.

12. Apparatus for discharging material at a rate which is more uniform than the rate which the apparatus may receive such material,
said apparatus comprising, in combination,
a material supporting bed having material receiving and material discharge portions, and
a plurality of material conveying components traversing a given course along said material supporting bed from the material receiving portion to the material discharge portion thereof,
said material conveying components being disposed in converging relationship relative to each other in a downstream direction from the material receiving portion of the material supporting bed along the given course toward the material discharge portion of the material supporting bed with the material conveying components being in close proximity and having parts thereof disposed in laterally overlapping relationship relative to the given course,
said material supporting bed having an intermediate portion defined by wall means extending in convergent directions generally parallel to and adjacent the material conveying components between the material receiving and material discharge portions of the material supporting bed with said wall means sloping generally inwardly toward the material conveying components and disposed relative thereto for storing material to enable variable material loadings to be received at the material receiving portion, integrated along the intermediate portion and delivered at a uniform rate to the material discharge portion of the material supporting bed.

13. Apparatus for discharging material at a rate which may be more uniform than the rate which the apparatus may receive such material,
said apparatus having
material receiving and material discharge portions,
a plurality of material conveying components each passing through a path along a given course from the material receiving portion to the material discharge portion of the apparatus,
said material conveying components being disposed in converging relationship relative to each other in a downstream direction from the material receiving portion of the apparatus along the given course toward the material discharge portion of the apparatus with the material conveying components being in close proximity and having parts thereof disposed in laterally overlapping relationship relative to the given course for integrating variable material loadings which may be received at the material receiving portion of the apparatus and for deflecting some of such integrated material generally laterally relative to the given course of the conveying components, and
means disposed along the given course of the conveying components in spaced relationship relative to the respective paths of the conveying components for receiving and storing such deflected material with said means being located between the material receiving and material discharge portions of the apparatus to enable such variable material loadings to be delivered at a uniform rate to the material discharge portion of the apparatus.

14. Apparatus for discharging material at a rate which may be more uniform than the rate which the apparatus may receive such material,
said apparatus comprising
a base having material receiving and material discharge portions, and
a plurality of material conveying components each passing through a path along a given course from the material receiving portion to the material discharge portion of the base,
said material conveying components being disposed in converging relationship relative to each other in a downstream direction from the material receiving portion of the base along the given course toward the material discharge portion of the base with the material conveying components being in close proximity and having parts thereof disposed in laterally overlapping relationship relative to the given course for integrating variable material loadings which may be received at the material receiving portion of the base and for deflecting some of such integrated material generally laterally in opposed directions relative to the given course of the conveying components beyond the respective paths thereof with that part of such integrated material which is not laterally deflected passing through the respective paths of the conveying components and along the given course thereof to the material discharge portion of the base, and
means disposed along the given course of the conveying components in spaced relationship relative to the respective paths of the conveying components for receiving and storing such deflected material with said means being located between the material receiving and material discharge portions of the base to enable such variable material loadings to be delivered at a uniform rate to the material discharge portion of the base.

References Cited in the file of this patent

UNITED STATES PATENTS

| | | |
|---|---|---|
| 652,420 | Burg | June 26, 1900 |
| 1,329,914 | McKenna | Feb. 3, 1920 |
| 1,969,372 | Hogg | Aug. 7, 1934 |
| 1,990,549 | Kimball | Feb. 12, 1935 |
| 2,263,458 | Gellatly | Nov. 18, 1941 |
| 2,608,041 | Schoenrock | Aug. 26, 1952 |
| 2,619,216 | Kinnicutt | Nov. 25, 1952 |
| 2,673,638 | Barrett | Mar. 30, 1954 |
| 2,828,851 | Thomas | Apr. 1, 1958 |